United States Patent
Guduru et al.

(10) Patent No.: US 11,956,322 B1
(45) Date of Patent: Apr. 9, 2024

(54) SYSTEMS AND METHODS FOR DETERMINING LOCATIONS OF EMERGENCY CALLERS IN STANDALONE NON-PUBLIC NETWORKS

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Raquel Morera Sempere, Weehawken, NJ (US); Ravi Potluri, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/938,201

(22) Filed: Oct. 5, 2022

(51) Int. Cl.
  *H04L 67/141* (2022.01)
  *H04L 65/1045* (2022.01)
  *H04W 76/50* (2018.01)

(52) U.S. Cl.
  CPC ........ *H04L 67/141* (2013.01); *H04L 65/1045* (2022.05); *H04W 76/50* (2018.02)

(58) Field of Classification Search
  CPC ... H04L 67/141; H04L 65/1045; H04W 76/50
  USPC ........................................................ 709/224
  See application file for complete search history.

(56) References Cited

U.S. PATENT DOCUMENTS

| | | | | |
|---|---|---|---|---|
| 9,602,556 | B1* | 3/2017 | Cham | H04L 65/1036 |
| 10,425,800 | B1* | 9/2019 | Panchal | H04W 4/025 |
| 2015/0063192 | A1* | 3/2015 | Zukas | H04W 76/50 |
| | | | | 370/312 |
| 2016/0037471 | A1* | 2/2016 | Mufti | H04W 36/14 |
| | | | | 370/328 |
| 2016/0366574 | A1* | 12/2016 | Dahan | H04W 36/0011 |
| 2017/0156043 | A1* | 6/2017 | Li | H04W 76/11 |
| 2017/0366955 | A1* | 12/2017 | Edge | H04W 4/90 |
| 2018/0352094 | A1* | 12/2018 | Ginter | H04L 65/1046 |
| 2021/0258763 | A1* | 8/2021 | Melander | H04L 65/1069 |

OTHER PUBLICATIONS

3rd Generation Partnership Project; Technical Specification Group Services and System Aspects; System architecture for the 5G System (5GS); Stage 2 (Release 17); 3GPP TS 23.501 V17.5.0, Jun. 2022, 568 Pages.

(Continued)

*Primary Examiner* — Karen C Tang

(57) ABSTRACT

A network device may receive, for an emergency call, a session initiation protocol (SIP) invite that includes a registered address of a user device that initiated the emergency call, and may determine whether the user device is associated with a private network based on the SIP invite. The network device may extract the registered address of the user device from the SIP invite and based on the user device being associated with the private network, and may provide the registered address to another network device. The other network device may determine a registered geographic location of the user device, based on the registered address, and may provide the registered geographic location to a public safety answering point associated with the emergency call.

20 Claims, 6 Drawing Sheets

(56) References Cited

OTHER PUBLICATIONS

3rd Generation Partnership Project; Technical Specification Group Services and System Aspects; Procedures for the 5G System (5GS); Stage 2 (Release 17); 3GPP TS 23.502 V17.5.0, Jun. 2022, 744 pages.

3rd Generation Partnership Project; Technical Specification Group Services and System Aspects; Policy and charging control framework for the 5G System (5GS); Stage 2 (Release 17); 3GPP TS 23.503 V17.5.0, Jun. 2022, 148 Pages.

5G; NR; Radio Resource Control (RRC); Protocol specification (3GPP TS 38.331 version 15.3.0 Release 15); ETSI TS 138 331 V15.3.0, Oct. 2018, 441 Pages.

5G; NG-RAN; NG data transport (3GPP TS 38.414 version 15.0.0 Release 15); ETSI TS 138 414 V15.0.0, Jul. 2018, 10 Pages.

* cited by examiner

SYSTEMS AND METHODS FOR DETERMINING LOCATIONS OF EMERGENCY CALLERS IN STANDALONE NON-PUBLIC NETWORKS

BACKGROUND

A non-3GPP internetworking function (N3IWF) acts as a gateway for a fifth generation (5G) core network via N2 and N3 interfaces. The N3IWF also provides a secure connection for a user device accessing the 5G core network over a non-3GPP access network via a secure Internet protocol (IPsec) between the user device and the N3IWF.

DETAILED DESCRIPTION OF EXAMPLE EMBODIMENTS

Figure 1A:
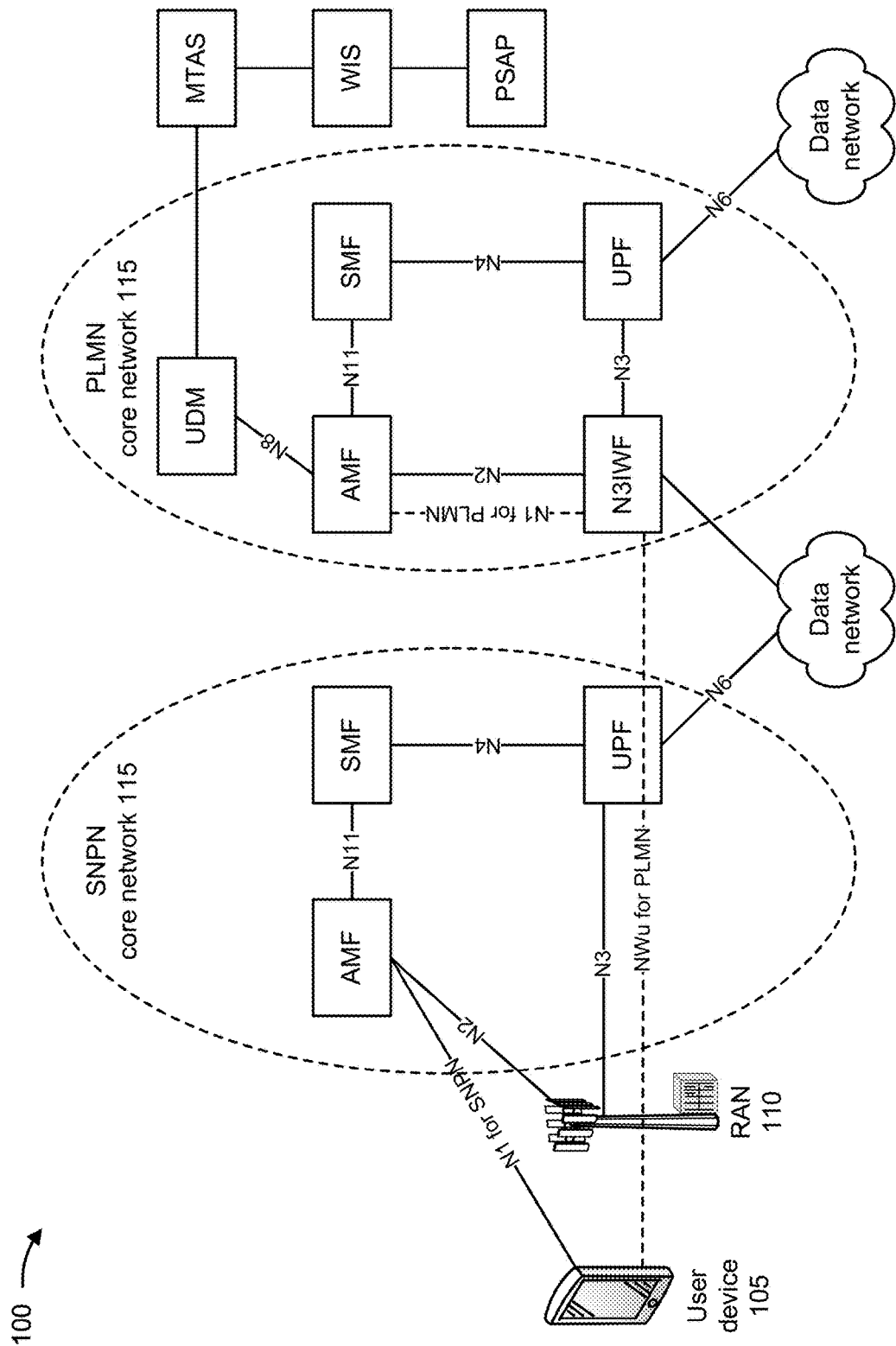
FIGS. 1A-1C are diagrams of an example associated with determining locations of emergency callers in standalone non-public networks.

The following detailed description of example implementations refers to the accompanying drawings. The same reference numbers in different drawings may identify the same or similar elements.

For non-public networks (e.g., private networks), the N3IWF may provide PLMN services to private networks in a standalone non-public network (SNPN) mode and may provide access to SNPN services via a public land mobile network (PLMN). A radio access network (RAN) of the SNPN may broadcast one or more PLMN identifiers (IDs) and network identifiers (NIDs) in a system broadcast enabling network selection or reselection, overload control, access control, and barring. A user device may identify the available PLMN IDs and the available NIDs from the broadcast system information and may automatically or manually select a network based on the available PLMN IDs and NIDs. When an SNPN is deployed for hybrid (e.g., indoor and outdoor) private networks, access to PLMN services are provided via the N3IWF interface. However, if a user device conducts an emergency (e.g., 911) call, a public safety answering point (PSAP) operator may not know a geographic location of the user device. Current 3GPP standards do not define standard interfaces to extract registered geographic locations from the N3IWF when a low latency and/or time-sensitive network (TSN) slice is deployed for private networks for various applications.

Thus, current mechanisms for determining geographic locations of emergency calls from private networks consume computing resources (e.g., processing resources, memory resources, communication resources, and/or the like), networking resources, and/or other resources associated with failing to determine a geographic location of an emergency caller associated with a private network, failing to provide emergency services to the emergency caller in a timely fashion due to failing to determine the geographic location of the emergency caller, attempting to determine the geographic location of the emergency caller associated with the private network, and/or the like.

Some implementations described herein provide a network device (e.g., a unified data management (UDM) device) that determines locations of emergency callers in standalone non-public networks. For example, the network device may receive, for an emergency call, a session initiation protocol (SIP) invite that includes a registered address of a user device that initiated the emergency call, and may determine whether the user device is associated with a private network based on the SIP invite. The network device may extract the registered address of the user device from the SIP invite and based on the user device being associated with the private network, and may provide the registered address to another network device. The other network device may determine a registered geographic location of the user device, based on the registered address, and may provide the registered geographic location to a public safety answering point associated with the emergency call.

In this way, the UDM determines locations of emergency callers in standalone non-public networks. For example, a user device may include a registered address of the user device in an emergency call, and may provide the emergency call to the UDM via the N3IWF. The UDM may identify the registered address, and may provide, via a mobile telephone activation system (MTAS), the registered address to a Wi-Fi information server (WIS) that stores a registered geographic location corresponding to the registered address of the user device ID. A PSAP may access the WIS to obtain the registered geographic location for the emergency call. Thus, the UDM may conserve computing resources, networking resources, and/or other resources that would otherwise have been consumed by failing to determine a geographic location of an emergency caller associated with a private network, failing to provide emergency services to the emergency caller in a timely fashion due to failing to determine the geographic location of the emergency caller, attempting to determine the geographic location of the emergency caller associated with the private network, and/or the like.

Figure 1B:
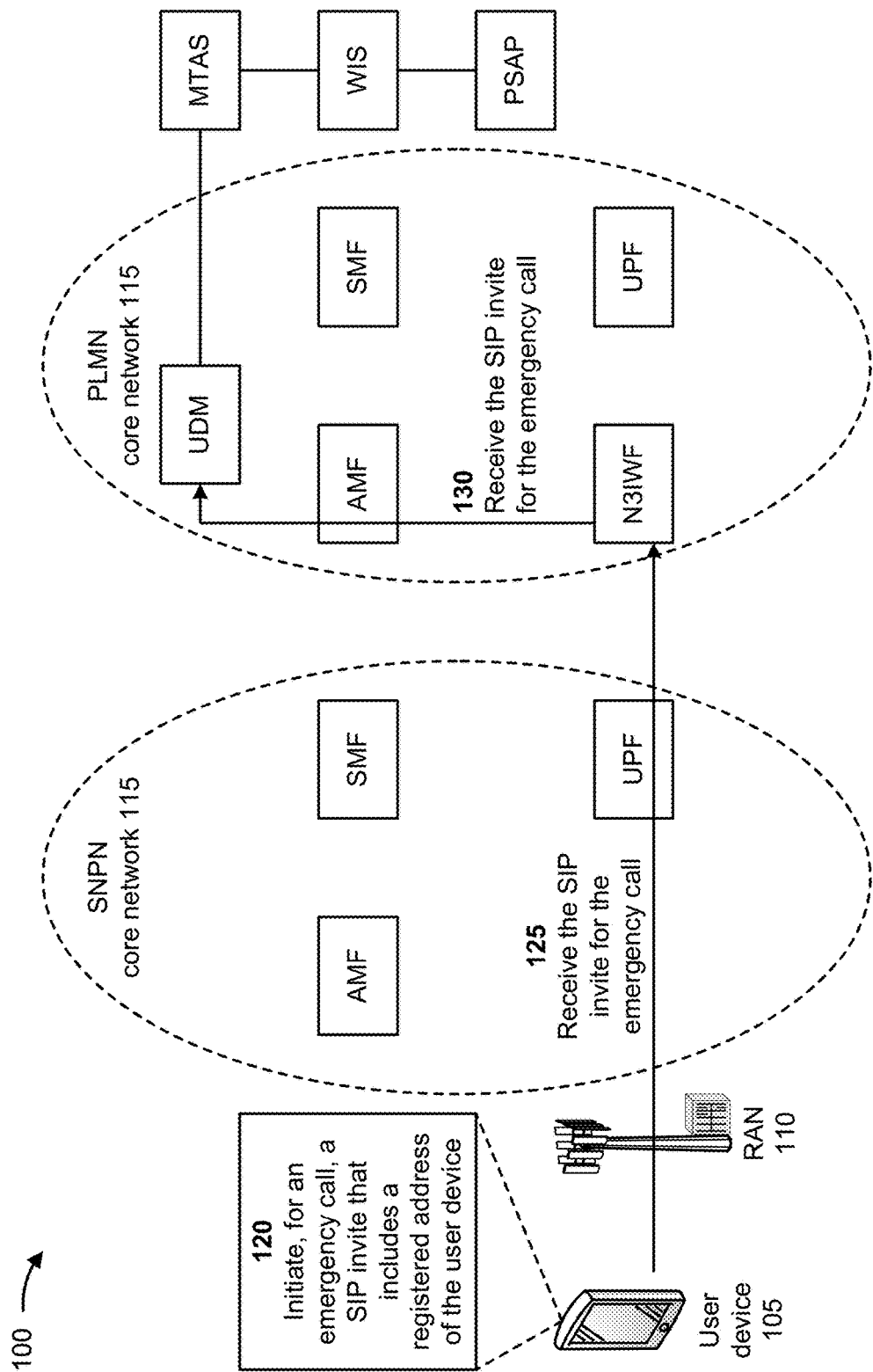
Figure 1C:
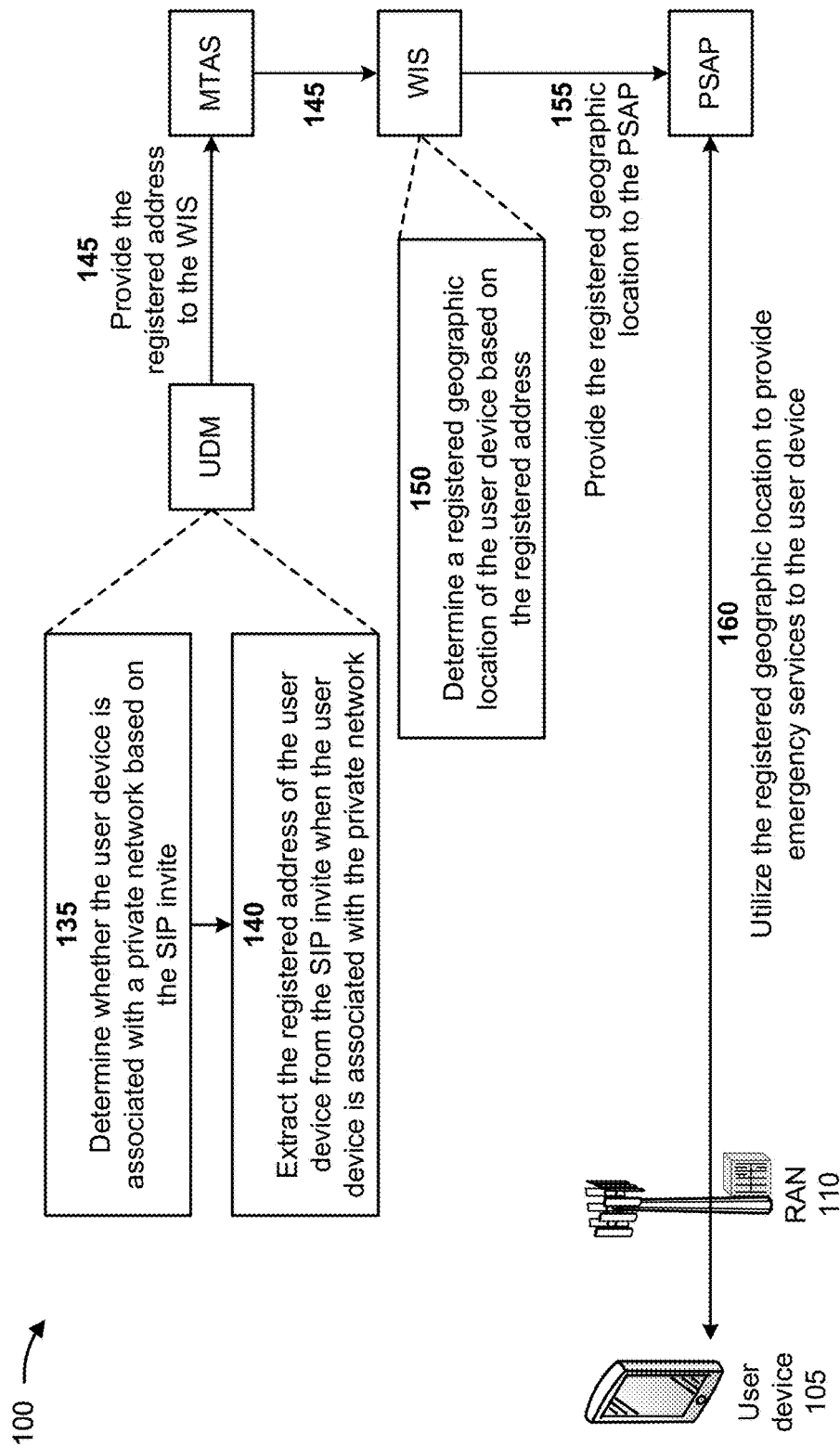

FIGS. 1A-1C are diagrams of an example 100 associated with determining locations of emergency callers in standalone non-public networks. As shown in FIGS. 1A-1C, example 100 includes a user device 105, a radio access network (RAN) 110, core networks 115 (e.g., an SNPN core network 115 and a PLMN core network 115), an MTAS, a WIS, a PSAP, and data networks. The SNPN core network 115 may include an access and mobility management function (AMF), a session management function (SMF), and a user plane function (UPF). The PLMN core network 115 may include an AMF, an SMF, a UPF, an N3IWF, and a UDM. Further details of the user device 105, the RAN 110, the core networks 115, the MTAS, the WIS, the PSAP, the data networks, the AMFs, the SMFs, the UPFs, the N3IWF, and the UDM are provided elsewhere herein. Although only a single user device 105 and RAN 110 are depicted in FIG. 1A, in some implementations multiple user devices 105 and RANs 110 may be associated with the core networks 115. In some implementations, the UDM of the PLMN core network 115 may be associated with a unified data repository (UDR) that stores information.

As further shown in FIG. 1A, the user device 105 may communicate with the AMF of the SNPN core network 115 via an N1 interface for SNPN. The N1 interface is a transparent interface from user device 105 to the AMF, and may be utilized to transfer information associated with the user device 105 (e.g., connection information, mobility information, sessions information, and/or the like) to the AMF. The RAN 110 may communicate with the AMF of the SNPN core network 115 via an N2 interface. The N2 interface is a control plane interface between the RAN 110 and the AMF, and may be utilized for connection management, user device context and protocol data unit (PDU) session management, and user device mobility management. The RAN 110 may communicate with the UPF of the SNPN core network 115 via an N3 interface. The N3 interface may convey user device data from the RAN 110 to the UPF to provide low-latency services and high-latency services.

As further shown in FIG. 1A, the UPF of the SNPN core network 115 may communicate with the SMF of the SNPN core network 115 via an N4 interface. The N4 interface provides a bridge between the control plane and the user plane, and may be utilized for PDU session management and traffic steering towards the UPF and PDU usage and event reporting towards the SMF. The UPF of the SNPN core network 115 may communicate with the data network via an N6 interface. The N6 interface may provide connectivity between the UPF and other networks, such as the Internet, a public cloud, or a private cloud. The AMF of the SNPN core network 115 may communicate with the SMF of the SNPN core network 115 via an N11 interface. Messages received over the N11 interface may represent a trigger to add, modify, or delete a PDU session across the user plane.

As further shown in FIG. 1A, the AMF of the PLMN core network 115 may communicate with the N3IWF of the PLMN core network 115 via an N2 interface, described above. The N3IWF of the PLMN core network 115 may communicate with the UPF of the PLMN core network 115 via an N3 interface, described above. The UPF of the PLMN core network 115 may communicate with the SMF of the PLMN core network 115 via an N4 interface, described above. The UPF of the PLMN core network 115 may communicate with the data network via an N6 interface, described above. The AMF of the PLMN core network 115 may communicate with the SMF of the PLMN core network 115 via an N11 interface, described above. The AMF of the PLMN core network 115 may communicate with the UDM of the PLMN core network 115 via an N8 interface. The N8 interface may emulate the UDM within the PLMN core network 115 and may offer services to the AMF.

As further shown in FIG. 1A, the user device 105 may communicate with the N3IWF of the PLMN core network 115 via an NWu for PLMN interface. The NWu interface may utilize a secure IP-based communication protocol (e.g., an Internet Key Exchange version 2 (IKEv2) authorization protocol and/or an extensible authentication protocol (EAP-5G)) between the user device 105 and the N3IWF to establish a secure data channel. The N3IWF of the PLMN core network 115 may also communicate with the AMF of the PLMN core network 115 via an N1 for PLMN interface, as described above. The UDM may communicate with the MTAS, and the MTAS may communicate with the WIS. The WIS may also communicate with the PSAP.

As shown in FIG. 1B, and by reference number 120, the user device 105 may initiate, for an emergency call, a SIP invite that includes a registered address of the user device 105. For example, the user device 105 may communicate with the SNPN core network 115 via the RAN 110. The SNPN core network 115 may be deployed for hybrid (e.g., indoor and outdoor) private networks (e.g., for factories, stadiums, manufacturing facilities, retail and public facilities, and/or the like), the user device 105 may access PLMN services provided by the PLMN core network 115, via the N3IWF. One of the PLMN services may include emergency services provided by the PSAP. A user may cause the user device 105 to conduct an emergency (e.g., 911) call with the PSAP. To conduct the emergency call, the user device 105 may initiate a SIP invite with a destination of the PSAP. In some implementations, the SIP invite may include a contact header that includes the registered address of the user device 105. The user device 105 in SNPN mode may provide a +SIP INSTANCE ID and an NSSAI in a Contact header of the SIP invite that uniquely identifies the device during an emergency call. The registered address of the user device 105 may include an IP address of the user device 105, a circuit identifier of the user device 105, a media access control (MAC) address of the user device 105, and/or the like.

As further shown in FIG. 1B, and by reference number 125, the N3IWF may receive the SIP invite for the emergency call. For example, the user device 105 may provide the SIP invite for the emergency call to the N3IWF, via the RAN 110 and the NWu interface provided between the user device 105 and the N3IWF. The N3IWF may receive the SIP invite for the emergency call from the user device 105, via the NWu interface.

As further shown in FIG. 1B, and by reference number 130, the UDM may receive the SIP invite for the emergency call. For example, the N3IFW may provide the SIP invite for the emergency call to the AMF of the PLMN core network 115 via the N1 interface provided between the N3IFW and the AMF of the PLMN core network 115. The AMF of the PLMN core network 115 may provide the SIP invite for the emergency call to the UDM via the N8 interface provided between the AMF of the PLMN core network 115 and the UDM. The UDM may receive the SIP invite for the emergency call from the AMF of the PLMN core network 115, via the N8 interface.

As shown in FIG. 1C, and by reference number 135, the UDM may determine whether the user device 105 is associated with a private network based on the SIP invite. For example, the user device 105 may be associated with a private network (e.g., the SNPN core network 115) when the user device 105 is utilizing a low latency and/or TSN slice of the SNPN core network 115. When the user device 105 is utilizing the low latency and/or TSN slice of the SNPN core network 115, the user device 105 may be provided with network slice selection assistance information (NSSAI) that uniquely identifies the low latency and TSN slice of the SNPN core network 115. The NSSAI may include information identifying a slice/service type) and an optional slice differentiator. The user device 105 may include the NSSAI in the SIP invite for the emergency call. The UDM may analyze the SIP invite to determine whether the SIP invite includes the NSSAI that uniquely identifies the low latency and/or TSN slice of the SNPN core network 115. When the SIP invite includes the NSSAI that uniquely identifies the low latency and/or TSN slice of the SNPN core network 115, the UDM may determine that the user device 105 is associated with a private network. Alternatively, when the SIP invite does not include the NSSAI that uniquely identifies the low latency and/or TSN slice of the SNPN core network 115, the UDM may determine that the user device 105 is not associated with a private network.

As further shown in FIG. 1C, and by reference number 140, the UDM may extract the registered address of the user device 105 from the SIP invite when the user device 105 is associated with the private network. For example, when the user device 105 is not associated with a private network, the UDM may treat the SIP invite for the emergency call in a conventional manner (e.g., may not extract the registered address of the user device 105 from the SIP invite). However, when the user device 105 is associated with a private network, the UDM may extract the registered address of the user device 105 from the SIP invite for the emergency call.

As further shown in FIG. 1C, and by reference number 145, the UDM may provide the registered address to the MTAS, and the MTAS may provide the registered address to the WIS. For example, when the user device 105 is associated with a private network, the UDM may provide the registered address of the user device 105 to the MTAS. The MTAS may support telephony services, such as multi-device applications and multimedia services, over multiple accesses (e.g., fixed, mobile, and Wi-Fi), and may provide the registered address of the user device 105 to the WIS.

As further shown in FIG. 1C, and by reference number 150, the WIS may determine a registered geographic location of the user device 105 based on the registered address. For example, the WIS may include a data structure (e.g., a database, a table, a list, and/or the like) that stores registered geographic locations of user devices 105 and corresponding registered addresses (e.g., network addresses, device identifiers, and/or the like) of the user devices 105. The WIS may receive the registered address of the user device 105 from the MTAS, and may utilize the registered address of the user device 105 to identify a corresponding registered geographic location of the user device 105 in the data structure. In some implementations, the registered geographic location of the user device 105 may include a geographic location of the private network (e.g., the SNPN core network 115) associated with the user device 105.

As further shown in FIG. 1C, and by reference number 155, the WIS may provide the registered geographic location of the user device 105 to the PSAP. For example, during the emergency call with the user device 105, the PSAP may generate a request for the registered geographic location of the user device 105, and may provide the request to the WIS. The WIS may receive the request, and may provide the registered geographic location of the user device 105 to the PSAP based on the request.

As further shown in FIG. 1C, and by reference number 160, the PSAP may utilize the registered geographic location to provide emergency services to the user device 105. For example, the PSAP may utilize the registered geographic location to provide emergency services to the user device 105, such as causing law enforcement to be dispatched to the registered geographic location, causing fire department personnel to be dispatched to the registered geographic location, causing an ambulance to be dispatched to the registered geographic location, and/or the like. In this way, the PSAP can quickly and efficiently dispatch appropriate emergency services to the user of the user device 105 during an emergency situation, which may save the life of the user and/or the lives of other people.

In this way, the UDM determines locations of emergency callers in standalone non-public networks. For example, a user device may include a registered address of the user device in an emergency call, and may provide the emergency call to the UDM via the N3IWF. The UDM may identify the registered address, and may provide, via an MTAS, the registered address to a WIS that stores a registered geographic location corresponding to the registered address of the user device. A PSAP may access the WIS to obtain the registered geographic location for the emergency call. Thus, the UDM may conserve computing resources, networking resources, and/or other resources that would otherwise have been consumed by failing to determine a geographic location of an emergency caller associated with a private network, failing to provide emergency services to the emergency caller in a timely fashion due to failing to determine the geographic location of the emergency caller, attempting to determine the geographic location of the emergency caller associated with the private network, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
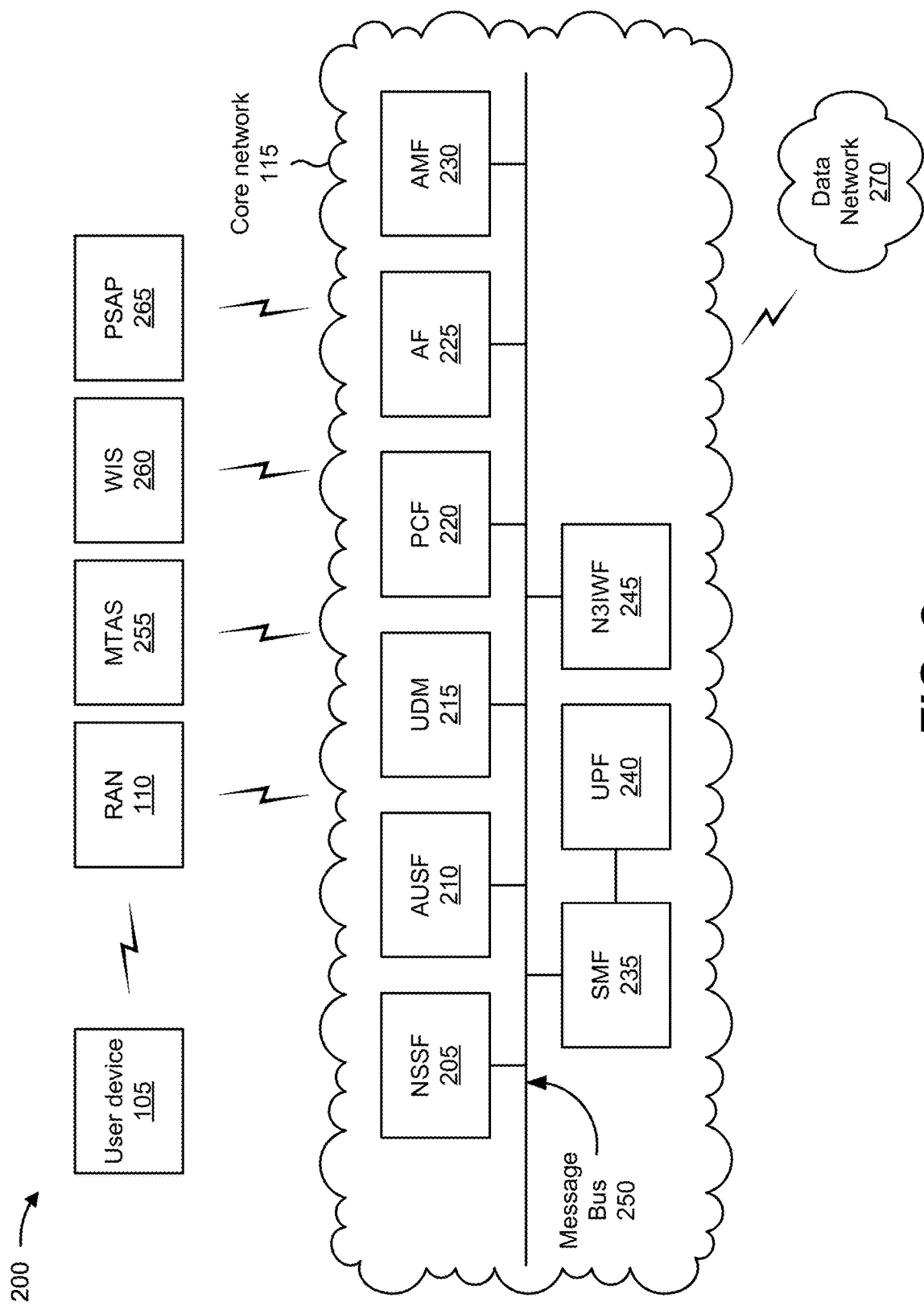
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115 (e.g., the SNPN core network 115 and/or the PLMN core network 115), an MTAS 255, a WIS 260, a PSAP 265, and a data network 270. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, an authentication server function (AUSF) 210, a UDM component 215, a policy control function (PCF) 220, an application function (AF) 225, an AMF 230, an SMF 235, a UPF 240, and/or an N3IWF 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the user device 105 in the wireless telecommunications system.

The UDM 215 includes one or more devices that store user data and profiles in the wireless telecommunications system. The UDM 215 may be used for fixed access and/or mobile access in the core network 115.

The PCF 220 includes one or more devices that provide a policy framework that incorporates network slicing, roaming, packet processing, and/or mobility management, among other examples.

The AF 225 includes one or more devices that support application influence on traffic routing, access to a network exposure function, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The N3IWF 245 includes one or more devices that acts as a gateway for the core network 115 via N2 and N3 interfaces associated with the core network 115. The N3IWF 245 may provide a secure connection for the user device 105 accessing the core network 115 over a non-3GPP access network, with support for a secure IP (IPsec) between the user device 105 and the N3IWF 245. For non-public networks (e.g., private networks), the N3IWF 245 may provide PLMN services to private networks in an SNPN mode and may provide access to SNPN services via PLMN.

The message bus 250 represents a communication structure for communication among the functional elements. In other words, the message bus 250 may permit communication between two or more functional elements.

The MTAS 255 includes one or more devices that provide mobile telephone services (e.g., voice and multimedia) to multiple user devices 105. The MTAS 255 may support legacy telephony services as well as future services, such as multi-device applications and multimedia services, over multiple accesses (e.g., fixed, mobile, and Wi-Fi).

The WIS 260 includes one or more devices that store registered geographic locations of user devices 105 and corresponding registered addresses (e.g., network addresses, device identifiers, and/or the like) of the user devices 105. The WIS 260 may be queried for a geographic location of a user device 105. For example, the WIS 260 may receive a unique identifier that represents the user device 105 (e.g., an IP address, circuit identifier, a media access control (IAC) address, and/or the like), and may returns the geographic location associated with the identifier.

The PSAP 265 includes one or more devices that are responsible for receiving emergency (e.g., 911) calls and processing the emergency calls according to a specific operating policy.

The data network 270 includes one or more wired and/or wireless data networks. For example, the data network 270 may include an Internet protocol multimedia subsystem (IMS) network, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
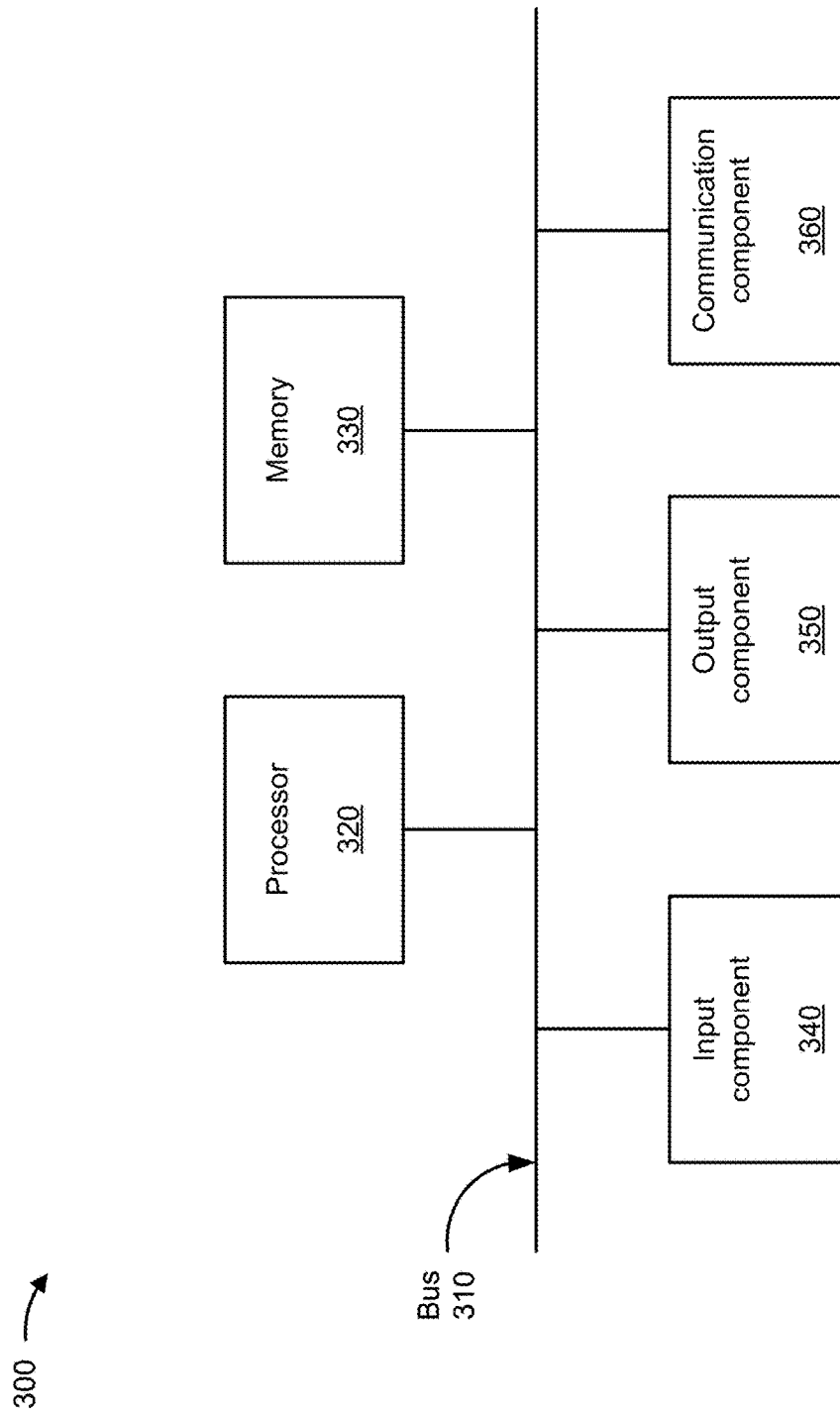
FIG. 3 is a diagram of example components of one or more devices of FIG. 2.

FIG. 3 is a diagram of example components of a device 300, which may correspond to the user device 105, the RAN 110, the NSSF 205, the AUSF 210, the UDM 215, the PCF 220, the AF 225, the AMF 230, the SMF 235, the UPF 240, the N3IWF 245, the MTAS 255, the WIS 260, and/or the PSAP 265. In some implementations, the user device 105, the RAN 110, the NSSF 205, the AUSF 210, the UDM 215, the PCF 220, the AF 225, the AMF 230, the SMF 235, the UPF 240, the N3IWF 245, the MTAS 255, the WIS 260, and/or the PSAP 265 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
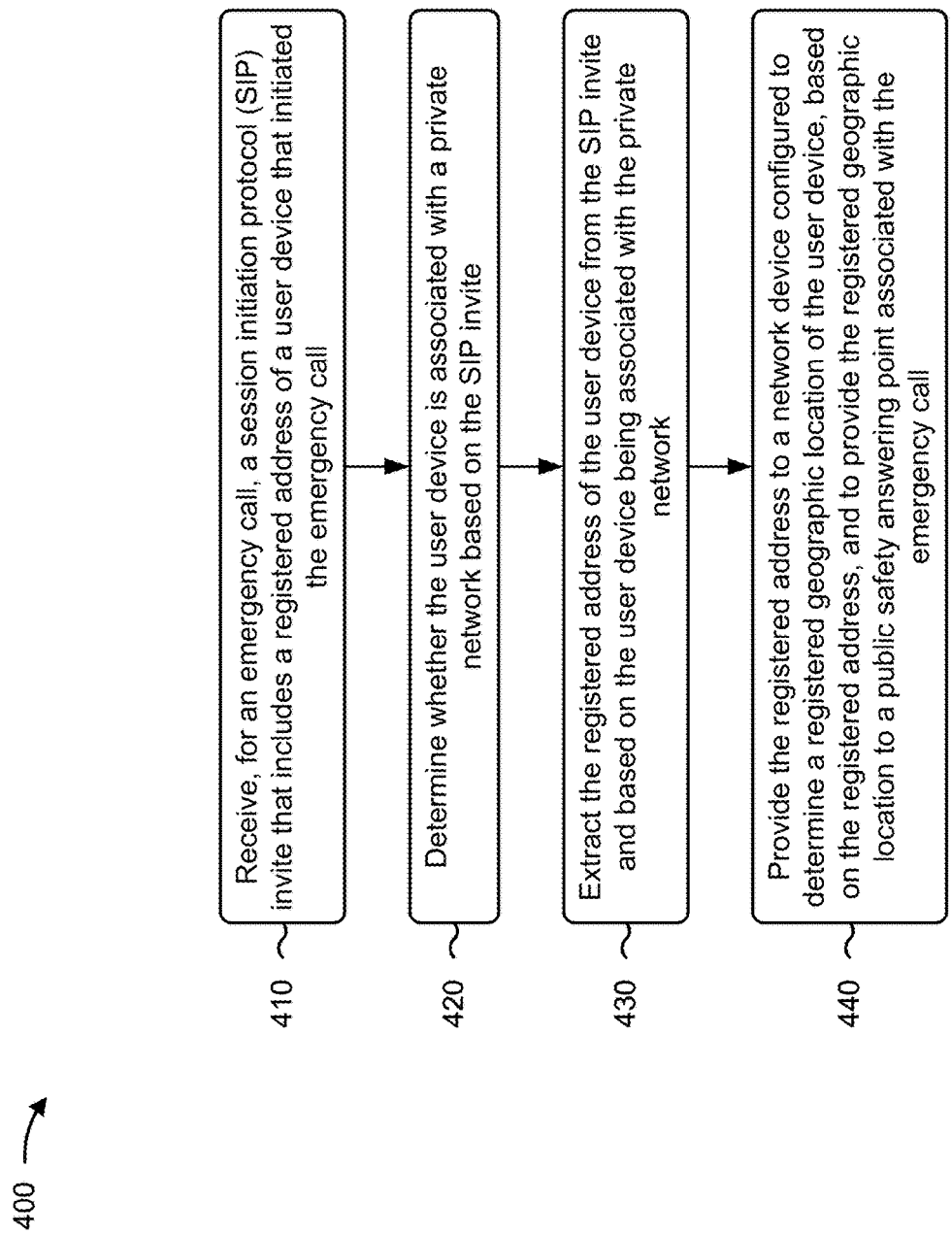
FIG. 4 is a flowchart of an example process for determining locations of emergency callers in standalone non-public networks.

FIG. 4 is a flowchart of an example process 400 for determining locations of emergency callers in standalone non-public networks. In some implementations, one or more process blocks of FIG. 4 may be performed by a network device (e.g., the UDM 215). In some implementations, one or more process blocks of FIG. 4 may be performed by another device or a group of devices separate from or including the network device, such as an N3IFW (e.g., the N3IFW 245) and/or a WIS (e.g., the WIS 260). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, for an emergency call, a SIP invite that includes a registered address of a user device that initiated the emergency call (block 410). For example, the network device may receive, for an emergency call, a SIP invite that includes a registered address of a user device that initiated the emergency call, as described above. In some implementations, receiving the SIP invite for the emergency call includes receiving the SIP invite from a gateway associated with a public network. In some implementations, the network device is associated with a public network. In some implementations, the network device is a UDM device of a public network. In some implementations, the registered address of the user device includes one of an IP address of the user device, a circuit identifier of the user device, or a MAC address of the user device.

As further shown in FIG. 4, process 400 may include determining whether the user device is associated with a private network based on the SIP invite (block 420). For example, the network device may determine whether the user device is associated with a private network based on the SIP invite, as described above. In some implementations, determining whether the user device is associated with the private network includes determining whether the SIP invite is associated with a low latency and time-sensitive network slice of the private network, and determining whether the user device is associated with the private network based on determining whether the SIP invite is associated with the low latency and time-sensitive network slice of the private network. In some implementations, the network device is associated with a PLMN and the private network is an SNPN. In some implementations, the network device is associated with a UDR.

In some implementations, determining whether the user device is associated with the private network includes determining whether the user device is associated with the private network based on the SIP invite being associated with a low latency and time-sensitive network slice of the private network.

As further shown in FIG. 4, process 400 may include extracting the registered address of the user device from the SIP invite and based on the user device being associated with the private network (block 430). For example, the network device may extract the registered address of the user device from the SIP invite and based on the user device being associated with the private network, as described above. In some implementations, extracting the registered address of the user device from the SIP invite includes extracting the registered address of the user device from a contact header of the SIP invite.

As further shown in FIG. 4, process 400 may include providing the registered address to another network device configured to determine a registered geographic location of the user device, based on the registered address, and to provide the registered geographic location to a PSAP associated with the emergency call (block 440). For example, the network device may provide the registered address to another network device configured to determine a registered geographic location of the user device, based on the registered address, and to provide the registered geographic location to a PSAP associated with the emergency call, as described above. In some implementations, the other network device is a WIS and providing the registered address to the other network device includes providing the registered address to the WIS, via a MTAS. In some implementations, the WIS is configured to store a plurality of registered geographic locations and a corresponding plurality of registered addresses associated with a plurality of user devices. In some implementations, the PSAP is configured to utilize the registered geographic location of the user device to provide an emergency service to the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device and for an emergency call, a session initiation protocol (SIP) invite that includes:
   a registered address of a user device that initiated the emergency call, and
   network slice selection assistance information (NSSAI);
   determining, by the network device and based on the NSSAI uniquely identifying a private network, that the user device is associated with the private network;
   extracting, by the network device, the registered address of the user device from the SIP invite and based on the user device being associated with the private network; and
   providing, by the network device, the registered address to another network device configured to determine a registered geographic location of the user device, based on the registered address, and to provide the registered geographic location to a public safety answering point associated with the emergency call.

2. The method of claim 1, wherein receiving the SIP invite for the emergency call comprises:
   receiving the SIP invite from a gateway associated with a public network.

3. The method of claim 1, wherein determining whether the user device is
further based on the NSSAI uniquely identifying a low latency and time-sensitive network slice of the private network.

4. The method of claim 1, wherein determining that the user device is associated with the private network comprises:
determining that the user device is associated with the private network based on extracting the NSSAI from a contact header of the SIP invite.

5. The method of claim 1, wherein extracting the registered address of the user device from the SIP invite comprises:
extracting the registered address of the user device from a contact header of the SIP invite.

6. The method of claim 1, wherein the other network device is a Wi-Fi information server (WIS) and wherein providing the registered address to the other network device comprises:
providing the registered address to the WIS, via a mobile telephone activation system.

7. The method of claim 6, wherein the WIS is configured to store a plurality of registered geographic locations and a corresponding plurality of registered addresses associated with a plurality of user devices.

8. A network device, comprising:
one or more processors configured to:
receive, for an emergency call, a session initiation protocol (SIP) invite that includes:
a registered address of a user device that initiated the emergency call, and
network slide selection assistance information (NSSAI);
determine, based on the NSSAI uniquely identifying a private network, that the user device is associated with the private network;
extract the registered address of the user device from a contact header of the SIP invite and based on the user device being associated with the private network; and
provide the registered address to another network device configured to determine a registered geographic location of the user device, based on the registered address, and to provide the registered geographic location to a public safety answering point associated with the emergency call.

9. The network device of claim 8, wherein the network device is associated with a public network.

10. The network device of claim 8, wherein the network device is a unified data management device of a public network.

11. The network device of claim 8, wherein the registered address of the user device includes one of:
an Internet protocol address of the user device,
a circuit identifier of the user device, or
a media access control address of the user device.

12. The network device of claim 8, wherein the public safety answering point is configured to utilize the registered geographic location of the user device to provide an emergency service to the user device.

13. The network device of claim 8, wherein the network device is associated with a public land mobile network, and the private network is a standalone non-public network.

14. The network device of claim 8, wherein the network device is associated with a unified data repository.

15. A non-transitory computer-readable medium storing a set of instructions, the set of instructions comprising:
one or more instructions that, when executed by one or more processors of a network device, cause the network device to:
receive, for an emergency call, a session initiation protocol (SIP) invite that includes:
a registered address of a user device that initiated the emergency call, and
network slice selection assistance information (NSSAI);
determine, based on extracting the NSSAI from the SIP invite, that the NSSAI uniquely identifies a low latency and time-sensitive network (TSN) slice of a private network;
determine, based on the NSSAI uniquely identifying the low latency and TSN slice of the private network, that the user device is associated with the private network;
extract the registered address of the user device from the SIP invite and based on the user device being associated with the private network; and
provide the registered address to another network device configured to determine a registered geographic location of the user device, based on the registered address, and to provide the registered geographic location to a public safety answering point associated with the emergency call.

16. The non-transitory computer-readable medium of claim 15, wherein the one or more instructions, that cause the network device to receive the SIP invite for the emergency call, cause the network device to:
receive the SIP invite from a gateway associated with a public network.

17. The non-transitory computer-readable medium of claim 15, wherein the one or more instructions, that cause the network device to extract the registered address of the user device from the SIP invite, cause the network device to:
extract the registered address of the user device from a contact header of the SIP invite.

18. The non-transitory computer-readable medium of claim 15, wherein the other network device is a Wi-Fi information server (WIS) and wherein the one or more instructions, that cause the network device to provide the registered address to the other network device, cause the network device to:
provide the registered address to the WIS, via a mobile telephone activation system.

19. The non-transitory computer-readable medium of claim 18, wherein the WIS is configured to store a plurality of registered geographic locations and a corresponding plurality of registered addresses associate with a plurality of user devices.

20. The non-transitory computer-readable medium of claim 15, wherein the registered address of the user device includes one of:
an Internet protocol address of the user device,
a circuit identifier of the user device, or
a media access control address of the user device.

* * * * *